(12) United States Patent
Min et al.

(10) Patent No.: US 8,547,517 B2
(45) Date of Patent: Oct. 1, 2013

(54) LIQUID CRYSTAL DISPLAY DEVICE

(75) Inventors: Hyo-Jin Min, Gyeonggi-do (KR); Han-Wook Hwang, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 13/330,894

(22) Filed: Dec. 20, 2011

(65) Prior Publication Data
US 2012/0268699 A1 Oct. 25, 2012

(30) Foreign Application Priority Data
Apr. 21, 2011 (KR) .......................... 10-2011-0037244

(51) Int. Cl.
*G02F 1/1339* (2006.01)
(52) U.S. Cl.
USPC .......................................... 349/156; 349/110
(58) Field of Classification Search
USPC ............ 349/106, 110, 155, 156, 157; 345/92
See application file for complete search history.

(56) References Cited

U.S. PATENT DOCUMENTS

| | | | |
|---|---|---|---|
| 6,522,379 B1* | 2/2003 | Ishihara et al. | 349/139 |
| 2002/0171800 A1* | 11/2002 | Miyazaki et al. | 349/156 |
| 2005/0259210 A1* | 11/2005 | Lee et al. | 349/156 |
| 2006/0263920 A1* | 11/2006 | Kim et al. | 438/30 |
| 2007/0052343 A1* | 3/2007 | Cho et al. | 313/495 |
| 2008/0180609 A1* | 7/2008 | Hong et al. | 349/106 |

* cited by examiner

*Primary Examiner* — Dung Nguyen
*Assistant Examiner* — Tai Duong
(74) *Attorney, Agent, or Firm* — Morgan, Lewis & Bockius LLP

(57) ABSTRACT

A liquid crystal display device includes an array substrate that includes gate and data lines crossing each other to define a pixel region, and a thin film transistor and a pixel electrode in the pixel region; an opposing substrate that faces the array substrate and includes a black matrix corresponding to a boundary of the pixel region, and a color filter layer filling a region surrounded by the black matrix; a patterned spacer on the black matrix and having a diamond shape in plane; and a liquid crystal layer between the array substrate and the opposing substrate, wherein the patterned spacer corresponds to a crossing portion of the gate and data lines, and vertices of the diamond shape of the patterned spacer are on the gate and data lines.

6 Claims, 8 Drawing Sheets

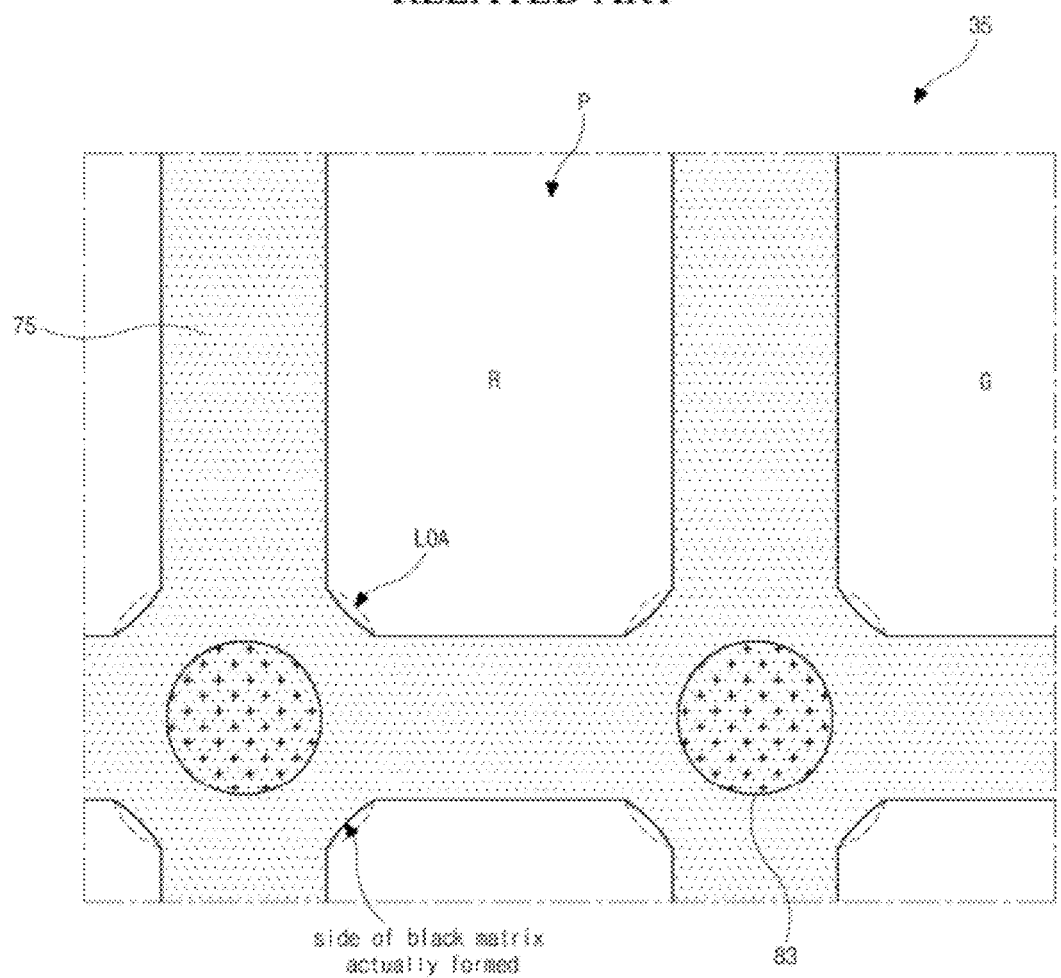

LIQUID CRYSTAL DISPLAY DEVICE

The present invention claims the benefit of Korean Patent Application No. 10-2011-0037244, filed in Korea on Apr. 21, 2011, which is hereby incorporated by reference for all purposes as if fully set forth herein.

BACKGROUND OF THE INVENTION

1. Field of the Invention

The present invention relates to a liquid crystal display device.

2. Discussion of the Related Art

Until recently, display devices have typically used cathode-ray tubes (CRTs). Presently, many efforts and studies are being made to develop various types of flat panel displays, such as liquid crystal display (LCD) devices, plasma display panels (PDPs), field emission displays, and electro-luminescence displays (ELDs), as a substitute for CRTs. Of these flat panel displays, LCD devices have many advantages, such as high resolution, light weight, thin profile, compact size, and low voltage power supply requirements.

In general, an LCD device includes two substrates that are spaced apart and face each other with a liquid crystal material interposed between the two substrates. The two substrates include electrodes that face each other such that a voltage applied between the electrodes induces an electric field across the liquid crystal material. Alignment of the liquid crystal molecules in the liquid crystal material changes in accordance with the intensity of the induced electric field into the direction of the induced electric field, thereby changing the light transmissivity of the LCD device. Thus, the LCD device displays images by varying the intensity of the induced electric field.

FIG. 1 is a perspective view illustrating an LCD device according to the related art.

Referring to FIG. 1, the LCD device 1 includes an array substrate 10, a color filter substrate 20 and a liquid crystal layer 30 between the array substrate 10 and the color filter substrate 20.

The array substrate 10 includes gate and data lines 14 and 16 crossing each other on a first e12 to define a pixel region P. A thin film transistor Tr is formed at a crossing portion of the gate and data lines 14 and 16. A pixel electrode 18 in the pixel region P is connected to the thin film transistor Tr.

The color filter substrate 20 includes a black matrix 25 on a second substrate 22 and corresponding to the gate and data lines 14 and 16 and the thin film transistor Tr. A color filter layer 26 corresponds to the pixel region P. The color filter layer includes red (R), green (G) and blue (B) color filter patterns 26a, 26b and 26c corresponding to the respective pixel regions P. A common electrode 28 is formed on the black matrix 25 and the color filter layer 26.

Although not shown in the drawings, spacers are located between the array substrate 10 and the color filter substrate 20 to maintain a cell gap therebetween and spaced apart from one another. The spacer is a ball spacer or patterned spacer. Further, a sealant is located along peripheral portions of the array substrate 10 and the color filter substrate 20 to prevent leakage of the liquid crystal layer 30. Further, polarizing plates are formed on outer surfaces of the array substrate 10 and the color filter substrate 20, respectively. A backlight unit is below the array substrate 10 to supply light.

When a gate signal is supplied to the gate line 14, the thin film transistor Tr is turned on and a data signal is supplied through the data line 16 to the pixel electrode 18. Accordingly, an electric field is induced between the pixel electrode 16 and the common electrode 28, and images are displayed through the LCD device 1.

FIG. 2 is a plan view illustrating an LCD device including a patterned spacer according to the related art, FIG. 3 is a view illustrating a black matrix configuration designed for the LCD device according to the related art, and FIG. 4 is a view illustrating a black matrix configuration actually formed for the LCD device according to the related art.

Referring to FIG. 2, the LCD device 35 includes an array substrate 40 in which gate and data lines 43 and 55 cross each other to define a pixel region P. A pixel electrode 67 is formed in the pixel region P and connected to a thin film transistor Tr.

The color filter substrate includes a black matrix 75 having openings corresponding to respective pixel regions P, red (R), green (G) and blue (B) color filter patterns filling the respective openings of the black matrix 75, and a common electrode covering the black matrix 75 and the color filter patterns.

Patterned spacers 83 are formed over the common electrode and overlap the black matrix 75. The patterned spacers 83 are spaced apart from one another and each have a cylindrical shape. The patterned spacers 83 function to maintain a cell gap between the array substrate 40 and the color filter substrate.

The black matrix 75 corresponding to the patterned spacer 83 should have the same shape as the patterned spacer 83 to prevent light leakage around the patterned spacer 83.

The patterned spacer 83 is generally designed to have a diameter of about 8 μm (micrometers) to about 13 μm to maintain the cell gap without defect of its falling down due to an external pressure.

However, a rubbing of an alignment layer is not made well in the region, where the patterned spacer 83 is formed, because of large step. Accordingly, abnormal rubbing occurs in a region of a diameter of about 10 μm to about 12 μm greater than the diameter of the black matrix 75 with respect to a center of the black matrix 75. Accordingly, light leakage occurs in a region LOA up to about 5 μm to about 6 μm from a circumference of the patterned spacer 83.

To block the light leakage region LOA, the black matrix 75 extends up to about 5 μm to about 6 μm from the circumference of the patterned spacer 83.

Referring to FIG. 3, the black matrix 75 is designed to be wider than that of the patterned spacer 83 considering the light leakage region LOA. However, referring to FIG. 4, because of light diffraction in forming the black matrix 75, the black matrix 75 actually formed has a shape that is not outward round as the patterned spacer 83 but inward round.

As such, the black matrix 75 is not formed as designed, and the light leakage region LOA is not fully blocked thus. Accordingly, light leakage occurs around the black matrix 75.

To prevent this problem, the black matrix 75 may be formed to have a greater width. However, this causes the black matrix 75 to more block the pixel region P, and aperture ration is reduced.

SUMMARY OF THE INVENTION

Accordingly, the present invention is directed to a liquid crystal display device which substantially obviates one or more of the problems due to limitations and disadvantages of the related art.

An advantage of the present invention is to provide a liquid crystal display device that can block light leakage around a patterned spacer and improve aperture ratio.

Additional features and advantages of the present invention will be set forth in the description which follows, and in part will be apparent from the description, or may be learned by practice of the invention. These and other advantages of the invention will be realized and attained by the structure particularly pointed out in the written description and claims thereof as well as the appended drawings.

To achieve these and other advantages and in accordance with the purpose of the present invention, as embodied and broadly described herein, a liquid crystal display device includes an array substrate that includes gate and data lines crossing each other to define a pixel region, and a thin film transistor and a pixel electrode in the pixel region; an opposing substrate that faces the array substrate and includes a black matrix corresponding to a boundary of the pixel region, and a color filter layer filling a region surrounded by the black matrix; a patterned spacer on the black matrix and having a diamond shape in plane; and a liquid crystal layer between the array substrate and the opposing substrate, wherein the patterned spacer corresponds to a crossing portion of the gate and data lines, and vertices of the diamond shape of the patterned spacer are on the gate and data lines.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 4 is a view illustrating a black matrix configuration actually formed for the LCD device according to the related art;

DETAILED DESCRIPTION OF THE ILLUSTRATED EMBODIMENTS

Reference will now be made in detail to the illustrated embodiments of the present invention, which are illustrated in the accompanying drawings.

Figure 5A:
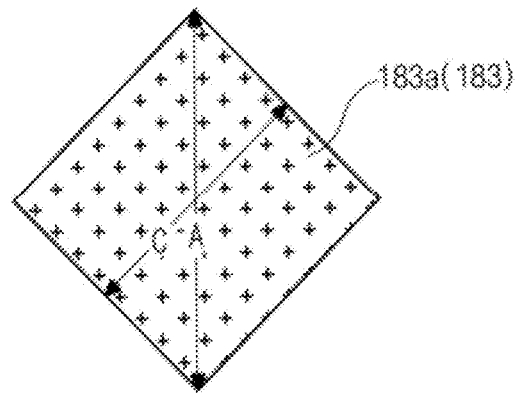
FIGS. 5A and 5B are views illustrating shapes in plane of patterned spacers of an LCD device according to an embodiment of the present invention.
Figure 5B:
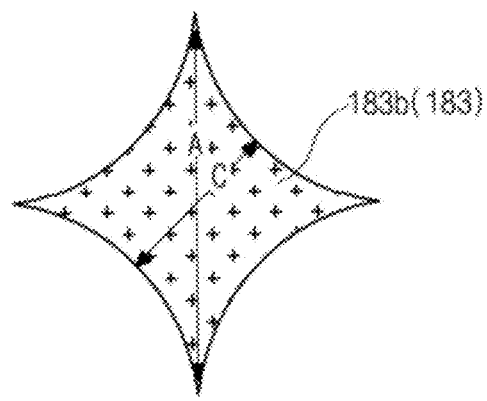
Figure 6:
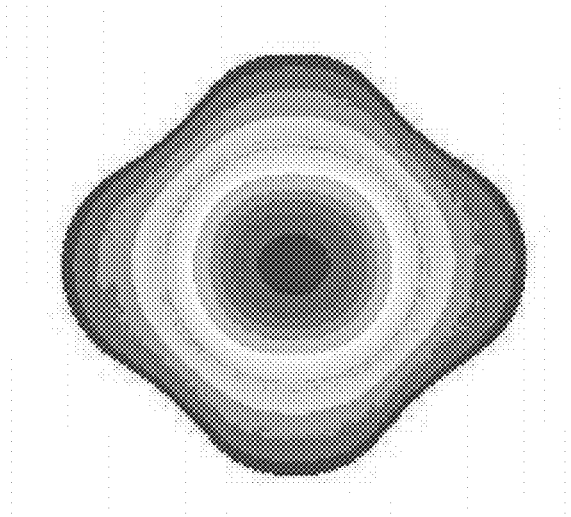
FIG. 6 is a view illustrating simulation result of a region where light leakage occurs around the patterned spacer of FIG. 5B.

FIGS. 5A and 5B are views illustrating shapes in plane of patterned spacers of an LCD device according to an embodiment of the present invention, and FIG. 6 is a view illustrating simulation result of a region where light leakage occurs around the patterned spacer of FIG. 5B.

Referring to FIGS. 5A and 5B, the patterned spacer 183 of the embodiment may have a column shape, and have a diamond shape in plane. With respect to the in-plane diamond shape, for example, the patterned spacer 183 may have a regular diamond shape shown in FIG. 5A or an inward-curved diamond shape in FIG. 5B. The inward-curved diamond shape of the embodiment means that four sides each have an inward curvature. For the purpose of explanations, the patterned spacer 183 of the regular diamond shape may be referred to as a first patterned spacer 183a, and the patterned spacer 183 of the inward-curved diamond shape may be referred to as a second patterned spacer 183b. Except for distinguishing the first and second patterned spacers 183a and 183b, they may be commonly referred to as the patterned spacer.

When a distance between opposite vertices of the diamond-shaped patterned spacer 183 is defined as "A" and a distance between opposite sides of the diamond-shaped patterned spacer 183 is defined as "C", it is preferred that A is about 10 to about 15, C is about 6 to about 11, and C is less than A (i.e., C<A).

Since the patterned spacer 183 has the diamond shape, compared to the related art using the circular-shaped patterned spacer, a width of a black matrix can be optimized to block light leakage region and the black matrix can be stably formed as designed.

Referring to FIG. 6, when the patterned spacer 183 has the inward-curved diamond shape as shown in FIG. 5B, due to the inward-curved diamond shape of the second patterned spacer 183b, light leakage region LOA has a shape similar to the second patterned spacer 183b and has an area greater than that of the second patterned spacer 183b.

A difference between the light leakage region LOA and the second patterned spacer 183b is that the second patterned spacer is sharp around the vertices thereof while the light leakage region is like round around the vertices thereof.

This light leakage region LOA around the second patterned spacer 183b has the shape that can make a black matrix patterned as designed with a width of a normal black matrix without extension of width. Accordingly, problems, such as increase of width of black matrix and a black matrix being not patterned as designed, is not caused. Accordingly, aperture ratio can be improved.

Figure 7:
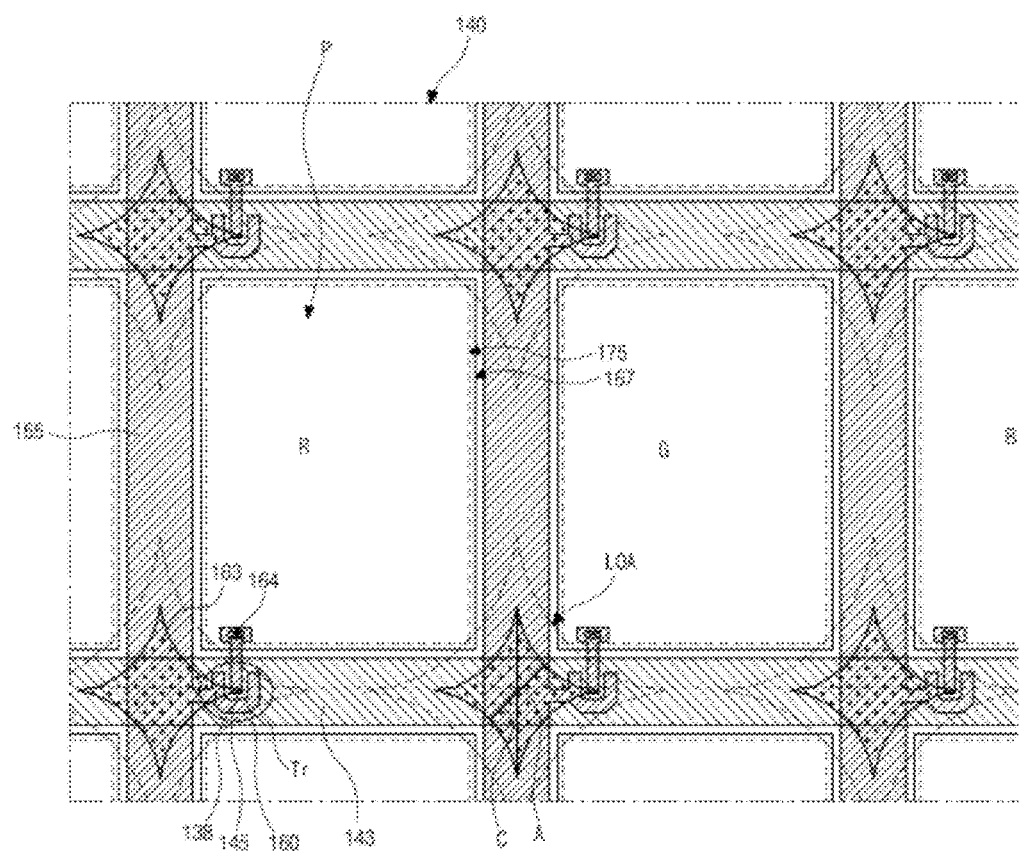
FIG. 7 is a plan view illustrating an LCD device including a patterned spacer according to the embodiment of the present invention.

FIG. 7 is a plan view illustrating an LCD device including a patterned spacer according to the embodiment of the present invention.

Referring to FIG. 7, the LCD device 135 includes an array substrate including a thin film transistor Tr and a pixel electrode 167 on a substrate 140, a color filter substrate including red (R), green (G) and blue (B) color filter patterns and a patterned spacer 183, and a liquid crystal layer between the array substrate and the color filter substrate.

The array substrate includes gate and data lines 143 and 155 to define a pixel region P. In the pixel region P, the thin film transistor Tr connected to the gate and data lines 143 and 155 is formed. The thin film transistor Tr includes a gate electrode 145 connected to the gate line 143, a source electrode 158 connected to the data line 155, a drain electrode 160 spaced apart from the source electrode 158, and a gate insulating layer and a semiconductor layer sequentially located between the gate electrode 143 and the source and drain electrodes 158 and 160.

The pixel electrode 167 made of a transparent conductive material is formed in the pixel region P and connected to the drain electrode 160 of the thin film transistor Tr.

The color filter substrate includes a black matrix 175 corresponding to the thin film transistor Tr and a boundary of the pixel region P, and a color filter layer including the red (R), green (G) and blue (B) color filter patterns corresponding to the respective pixel regions P.

Further, the color filter substrate includes a common electrode covering the color filter layer and made of a transparent conductive material, and the patterned spacer 183 that corresponds to a crossing portion of the gate and data lines 143 and 155, has a diamond shape in plane, and has a columnar shape in three dimensions.

Four vertices of the patterned spacer 183 are on a first direction (i.e., an extension direction of the gate line 143) and a second direction (i.e., an extension direction of the data line 155).

According to this configuration of the patterned spacer 183, a portion, which is blocked by the black matrix 175 corresponding to the gate and data lines 143 and 155, of light leakage region LOA around the patterned spacer 183 substantially increases.

Figure 1:
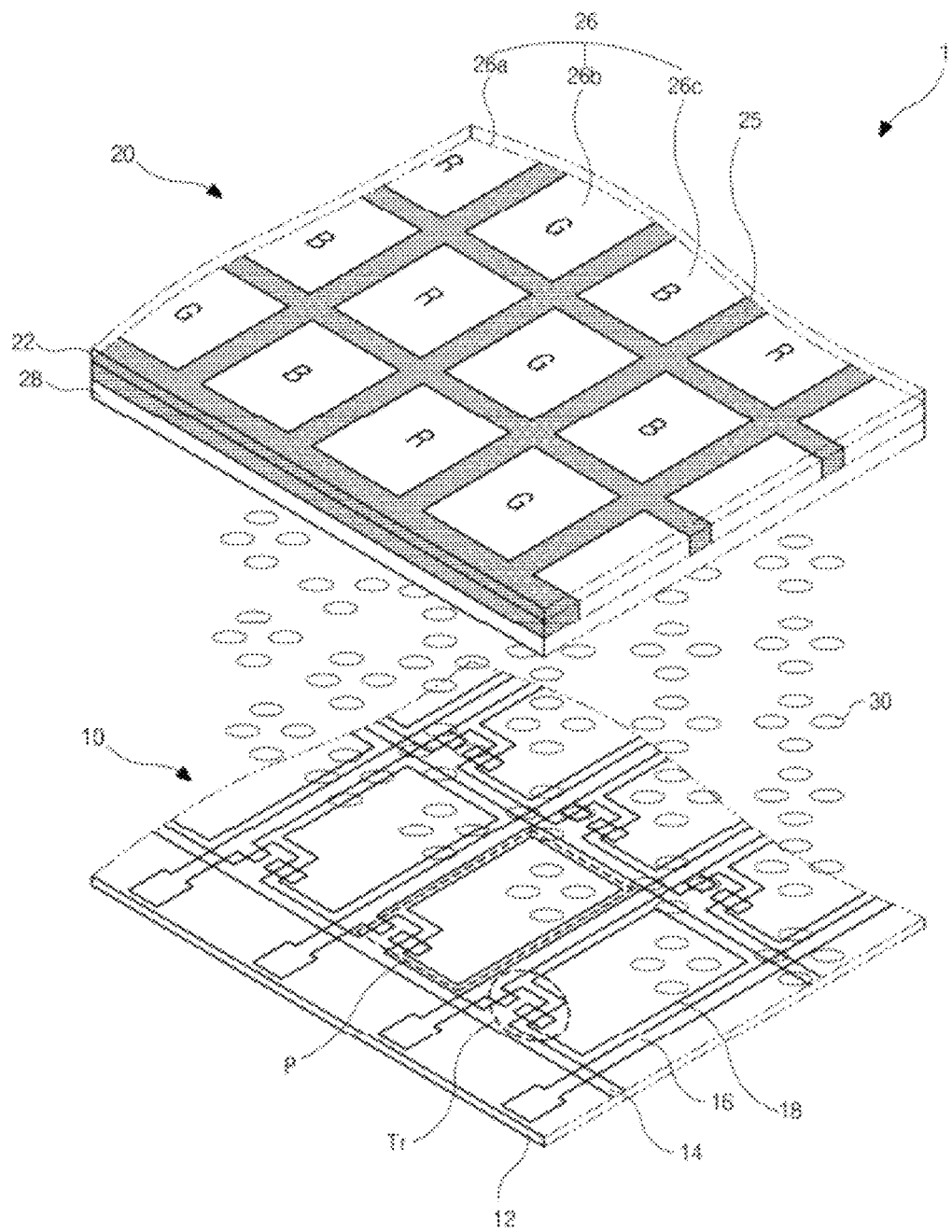
FIG. 1 is a perspective view illustrating an LCD device according to the related art.
Figure 2:
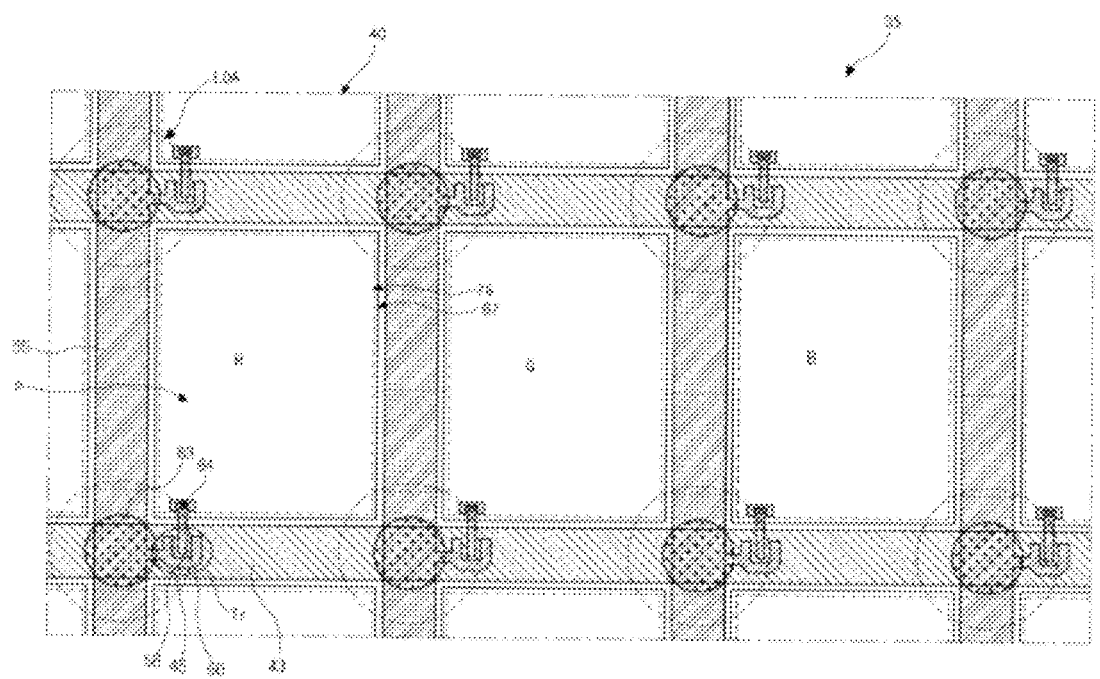
FIG. 2 is a plan view illustrating an LCD device including a patterned spacer according to the related art.
Figure 3:
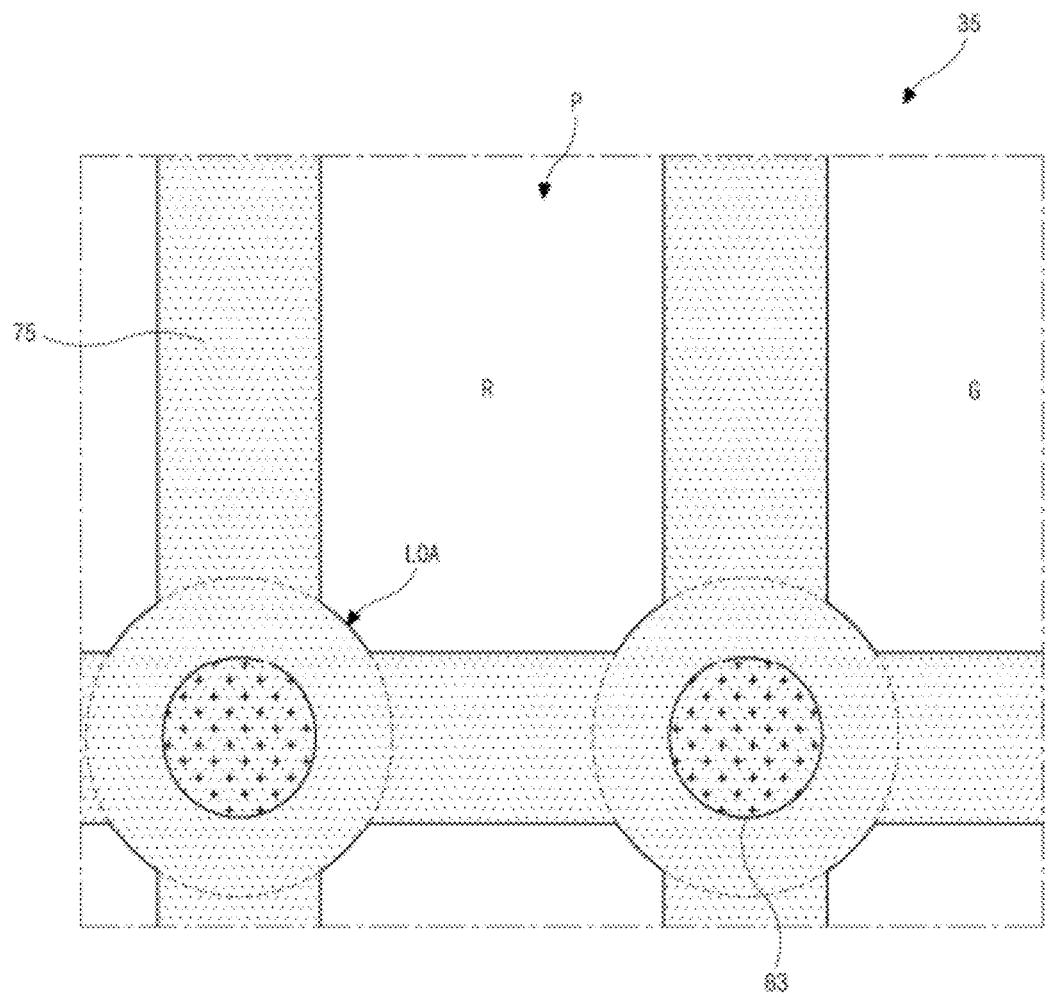
FIG. 3 is a view illustrating a black matrix configuration designed for the LCD device according to the related art.

Since the light leakage around the patterned spacer (83 of FIG. 2) in the related art has a circular shape in plane, a black matrix around this patterned spacer should be patterned to have a circular shape. However, in this patterning process, due to light diffraction, circular-shape pattern is almost impossible. This causes increase of width of black matrix.

However, according to the embodiment, the patterned spacer 183 has the regular or inward-curved diamond shape. Further, the patterned spacer 183 is positioned such that it corresponds to the crossing portion of the gate and data lines 143 and 155 and vertices in plane thereof are on the first and second directions. Accordingly, the light leakage region LOA can be most efficiently blocked without increase of width of black matrix.

In other words, since the patterned spacer 183 is positioned at the overlapping portion of the gate and data lines 143 and 155 and the vertices thereof are positioned on the gate and data lines 143 and 155 outside the crossing portion, even though a distance A between the opposite vertices is greater than a distance required for a role as a patterned spacer, the black matrix 175 has a length in a extension direction thereof much greater than the distance A. Accordingly, even though a length of the light leakage region A increases due to increase of the distance A, this does not cause an additional extension of the black matrix 175.

Further, the patterned spacer 183 has the distance A greater than a distance C between opposite sides. Accordingly, when the patterned spacer 183 has an area as required, by making the distance A between the opposite vertices greater than the diameter of the related art patterned spacer and the distance C between the opposite sides less than the diameter of the related art patterned spacer, the black matrix 175 around the patterned spacer 183 can efficiently prevent light leakage without increase of width.

As the distance C decreases (i.e., the opposite sides get closer to each other), an area of the light leakage region LOA exceeding a width of the black matrix 175 corresponding to the gate and data lines 143 and 155 further decreases.

In the embodiment, the patterned spacer 183 is formed to have the regular shape or the curved shape. Accordingly, compared to the related art patterned spacer, a distance between the side of the patterned spacer 183 and a corresponding side surface of the black matrix 175 increases, and an area of the black matrix 175 to prevent the light leakage region LOA thus increases. Accordingly, the light leakage around the patterned spacer 183 can be efficiently blocked without a partial extension of the black matrix 175.

Therefore, a partial extension of the black matrix 175 around the spacer 183 is minimized or not needed, and aperture ratio can thus be improved.

Further, since the patterned spacer 183 is formed with the diamond shape, prevented can be a problem in the related art that due to light diffraction in forming a circular-shaped black matrix, a black matrix actually formed is very different other than designed.

Further, the light leakage is efficiently prevented and contrast ratio can thus be improved.

Figure 8:
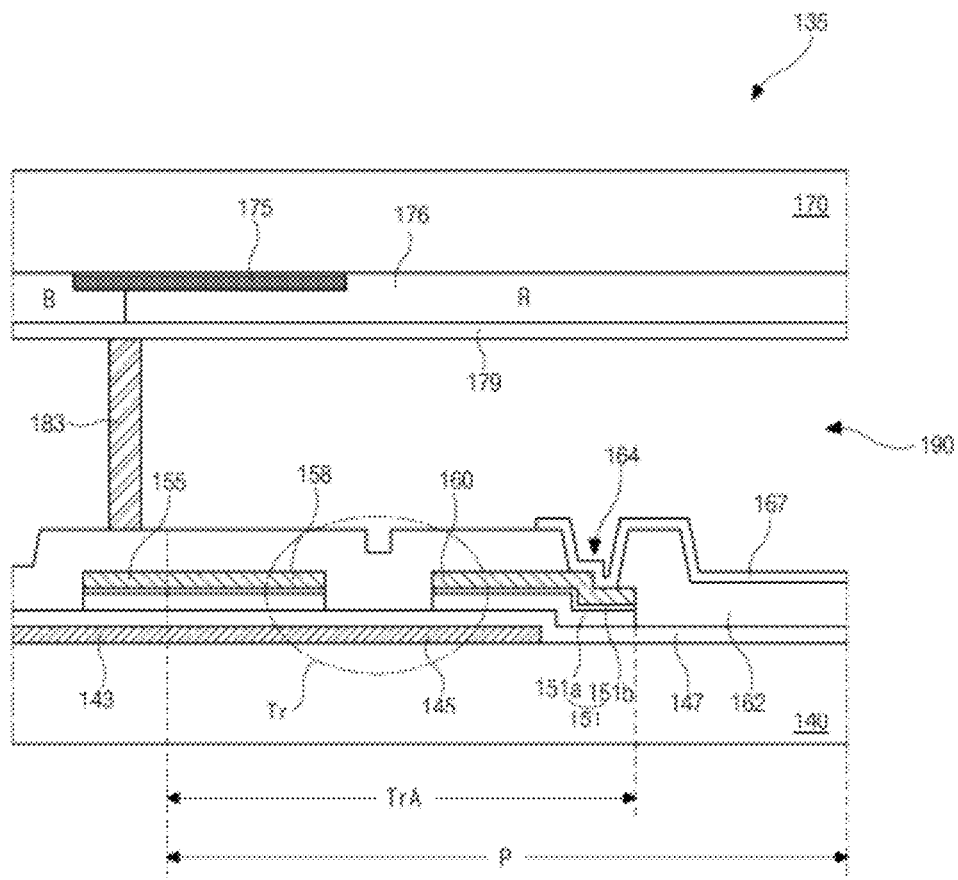
FIG. 8 is a cross-sectional view taken along a line VIII-VIII of FIG. 7.

FIG. 8 is a cross-sectional view taken along a line VIII-VIII of FIG. 7. For the purpose of explanations, a region where the thin film transistor Tr is formed is referred to as a switching region TrA.

The LCD device 135 includes the array substrate, the color filter substrate, and the liquid crystal layer 190 between the array substrate and the color filter substrate.

The array substrate includes the gate line 143 along a first direction and a gate electrode 145 in the switching region TrA on a first substrate 140. The gate line 143 and the gate electrode 145 may be formed with a single or multiple-layered structure using at least one of aluminum (Al), aluminum alloy (e.g., AlNd), copper (Cu), copper alloy, molybdenum (Mo), molybdenum-titanium (MoTi).

A gate insulating layer 147 is formed on the gate line 143 and the gate electrode 145 and may be made of an inorganic insulating material, for example, silicon oxide ($SiO_2$) or silicon nitride (SiNx).

A data line 155 is formed on the gate insulating layer 147 crossing the gate line 143 to define a pixel region P. The data line 155 may be formed with a single or multiple-layered structure using at least one of aluminum (Al), aluminum alloy (e.g., AlNd), copper (Cu), copper alloy, molybdenum (Mo), molybdenum-titanium (MoTi).

In the switching region TrA, a semiconductor layer 151 is formed on the gate insulating layer 147 and includes an active layer 151a made of intrinsic amorphous silicon and an ohmic contact layer 151b made of impurity-doped amorphous silicon. Source and drain electrodes 158 and 160 spaced apart from each other are formed on the semiconductor layer 151 and are made of the same material as the data line 155. The source electrode 158 is connected to the data line 155.

The gate electrode 145, the gate insulating layer 147, the semiconductor layer 151 and the source and drain electrodes 158 and 160 in the switching region TrA form a thin film transistor Tr.

A passivation layer 162 is formed on the data line 155 and the source and drain electrodes 158 and 160, and may be made of an inorganic insulating material, for example, silicon oxide ($SiO_2$) or silicon nitride (SiNx). The passivation layer 162 includes a drain contact hole 164 exposing the drain electrode 160.

A pixel electrode 167 is formed on the passivation layer 162 in the pixel region P and connected to the drain electrode 160 through the drain contact hole 164.

The color filter substrate includes a black matrix 175 of a lattice shape on a second substrate 170 that has an opening corresponding to the pixel region P. The black matrix 175 corresponds to the gate and data lines 143 and 155 and the switching region TrA.

A color filter layer 176 filling the opening of the black matrix 175 and overlapping the black matrix 175 is formed. The color filter layer 176 includes red (R), green (G) and blue (B) color filter patterns corresponding to the respective pixel regions P.

A common electrode 179 is formed on the color filter layer 176 and is made of a transparent conductive material, for example, indium-tin-oxide (ITO) or indium-zinc-oxide (IZO).

An overcoat layer may be formed between the color filter layer 176 and the common electrode 179 to planarize the color filter substrate.

Figure 9:
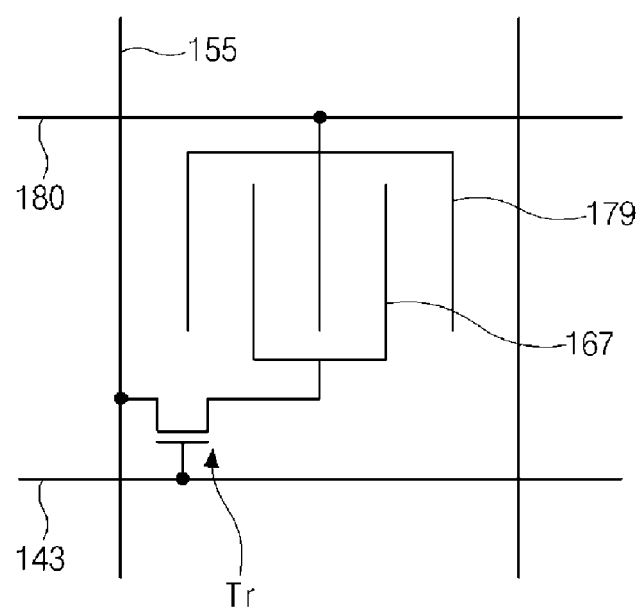
FIG. 9 is a view illustrating a common electrode and a pixel electrode on the same array substrate.

In the embodiment, the LCD device 135 including the pixel and common electrodes 167 and 179 on the different substrates is explained. Alternatively, referring to FIG. 9, bar-shaped pixel and common electrodes 167 and 179 alternate in each pixel region on the same substrate i.e., the array substrate. In this case, a common line 180 may be formed that is connected to the common electrodes 179 and is parallel with and at the same layer as the gate line 143. Further, in the alternative embodiment, the color filter substrate does not need the common electrode 179 and needs an overcoat layer on the color filter layer 176.

A patterned spacer 183 is on the common electrode 179 corresponding to a crossing portion of the gate and data lines 143 and 155. The patterned spacer 183 has a regular or inward-curved diamond shape in plane, as shown in FIG. 5A or 5B. In the alternative embodiment, the patterned spacer 183 is on the overcoat layer.

The patterned spacer 183 completely overlaps the black matrix 175. To prevent light leakage around the patterned spacer 183, a distance between a side of the patterned spacer 183 and a corresponding side of the black matrix 175 is at least about 5 μm.

In this case, a distance (A of FIG. 7) between the opposite vertices of the patterned spacer 183 is about 10 μm to about 15 μm, and a distance (C of FIG. 7) between the opposite sides of the patterned spacer 183 is about 6 μm to about 11 μm. The distance A is greater than the distance C.

As described above, the patterned spacer has the diamond shape in plane and can thus be formed as designed.

Further, since the patterned spacer corresponds to the crossing portion of the gate and data lines and the vertices are positioned on the gate and data lines, the black matrix corresponding to the patterned spacer does not have a width-increased portion or has a width-increases portion minimized. Accordingly, aperture ratio can be improved.

Further, the light leakage region is efficiently blocked, and contrast ratio can thus be improved.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
an array substrate that includes gate and data lines crossing each other to define a pixel region, and a thin film transistor and a pixel electrode in the pixel region;
an opposing substrate that faces the array substrate and includes a black matrix corresponding to a boundary of the pixel region, and a color filter layer filling a region surrounded by the black matrix;
a patterned spacer on the black matrix and having a diamond shape in plane; and
a liquid crystal layer between the array substrate and the opposing substrate,
wherein the patterned spacer corresponds to a crossing portion of the gate and data lines, and vertices of the diamond shape of the patterned spacer are on the gate and data lines outside the crossing portion of the gate and data lines.

2. The device according to claim 1, wherein the patterned spacer has an inward-curved diamond shape in plane, four sides of which each have an inward curvature.

3. The device according to claim 1 wherein a distance between opposite vertices of the diamond shape is about 10 μm to 15 μm, a distance between opposite sides of the diamond shape is about 6 μm to about 11 μm, and the distance between the opposite vertices is greater than the distance between the opposite sides.

4. The device according to claim 1, wherein a distance between a side of the diamond shape and a corresponding side surface of the black matrix is about 5 μm or more.

5. The device according to claim 1, wherein the opposing substrate further includes a common electrode on the color filter layer, and wherein the patterned spacer is on the common electrode.

6. The device according to claim 1, wherein the array substrate further includes a common line that is parallel with and formed at the same layer as the gate line, and a common electrode that alternates with the pixel electrode in the pixel region and is connected to the common line.

* * * * *